(12) United States Patent
Frost et al.

(10) Patent No.: US 8,495,538 B1
(45) Date of Patent: Jul. 23, 2013

(54) POWER ESTIMATION OF A CIRCUIT DESIGN

(75) Inventors: Alan M. Frost, Cupertino, CA (US); Paul R. Schumacher, Berthoud, CO (US); Timothy J. Burke, Estes Park, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/585,564

(22) Filed: Aug. 14, 2012

(51) Int. Cl.
*G06F 9/455* (2006.01)
*G06F 17/50* (2006.01)

(52) U.S. Cl.
USPC ........... 716/109; 716/121; 716/128; 716/133; 716/139

(58) Field of Classification Search
USPC ................ 716/109, 121, 128, 133, 139
See application file for complete search history.

(56) References Cited

U.S. PATENT DOCUMENTS

| | | | |
|---|---|---|---|
| 7,143,368 B1 * | 11/2006 | Plofsky et al. | 716/109 |
| 7,552,410 B1 * | 6/2009 | Chirania | 716/109 |
| 7,810,058 B1 * | 10/2010 | Tuan | 716/109 |
| 7,882,457 B1 * | 2/2011 | Plofsky et al. | 716/132 |
| 8,037,435 B1 * | 10/2011 | Chesal et al. | 716/104 |
| 8,201,121 B1 * | 6/2012 | Sankaralingam et al. | 716/109 |
| 8,217,679 B2 * | 7/2012 | Miller | 326/39 |
| 2002/0004927 A1 * | 1/2002 | Takahashi et al. | 716/2 |
| 2002/0138809 A1 * | 9/2002 | Roethig et al. | 716/1 |
| 2005/0278664 A1 * | 12/2005 | Chaudhry et al. | 716/4 |
| 2008/0177488 A1 * | 7/2008 | Niitsuma et al. | 702/60 |
| 2008/0184049 A1 * | 7/2008 | Mathur et al. | 713/320 |
| 2012/0017188 A1 * | 1/2012 | Lepak et al. | 716/109 |
| 2012/0131523 A1 * | 5/2012 | Lu et al. | 716/102 |

OTHER PUBLICATIONS

"PowerPlay Early Power Estimator User Guide", by Altera, Jul. 2012.*

* cited by examiner

*Primary Examiner* — Nha Nguyen
(74) *Attorney, Agent, or Firm* — LeRoy D. Maunu; Lois D. Cartier (57) ABSTRACT

Approaches for estimating power consumption of a circuit based on a circuit design. For one or more modules of the design, data are input that indicate measured power consumption and circuit resources used by the one or more modules. For one or more other parts of the design, values of parameters are input that specify an operating speed and a resource count. Process-corner, voltage, and temperature values are input. An estimated level of power consumption is determined as a function of the measured power consumption, the values of the parameters, and the values of the process-corner, voltage, and temperature. Data indicative of the estimated level of power consumption are output.

14 Claims, 5 Drawing Sheets

POWER ESTIMATION OF A CIRCUIT DESIGN

TECHNICAL FIELD

One or more embodiments generally relate to estimating power consumption of a circuit design using a predetermined level of power consumption for part of the design and computing an estimated level of power consumption for other parts of the design.

BACKGROUND

Power consumption is becoming an increasingly important design consideration for electronic devices. Estimating power consumption for a circuit design that is to be implemented in a programmable IC (integrated circuit) such as a PLD (programmable logic device) is typically performed using designer-estimated resource counts or information from a completely implemented design. The power estimation also uses clock frequencies and global toggle rate defaults, which may be individually changed by the designer.

High levels of integration of circuit designs have presented challenges for estimating power consumption. Many circuit designs that were in the past implemented on multiple ICs (e.g., micro-processor, memory, SERDES interface, DSP, glue logic etc.) may now be implemented on a single chip. Multi-chip implementations permitted estimation of power consumption by summing the levels of power consumption of individual ICs numbers and estimated levels for the board level traces and passive components. The power consumption of each IC could be independently determined, estimated or obtained from the manufacturer. When components were added, removed, or changed during development of a design, a new estimate of power consumption could be easily determined with straightforward computations.

With a highly integrated design, estimating a level of power consumption is typically performed at the full-chip level using either resource-based or netlist-based power estimation tools. An example implementation of a highly integrated design is a circuit implemented on a chip or package that includes one or more processors, memory and field programmable gate array (FPGA) logic. Some tools that estimate the level of power consumption for such system on a chip (SOC) designs analyze the resource usage based on express resource counts or resource counts derived from the netlist in order to arrive at the estimated level of power consumption for the full SOC. This approach may be less accurate than is possible given additional information that may be available.

Some logic modules to be implemented in programmable logic may come from a source other than the party making the SOC design. The providers of those modules may have measured power consumption of those modules as implemented in an actual circuit. The measured level of power consumption is more accurate than an estimation based on the netlist or resource utilization. However, with tools that base power estimation on the resource count or netlist of the SOC design, the more accurate measured level of power consumption is not used in the estimation. Thus, the estimated level of power consumption may be less accurate than desirable.

SUMMARY

In one approach, a system is provided for estimating power consumption of a circuit based on a circuit design. The system includes a storage arrangement and a processor coupled to the storage arrangement. The storage arrangement is configured with instructions that when executed by the processor cause the processor to perform operations including inputting a description of the circuit design. Also input is a measured level of power consumption and a description for one module of the circuit design. Process-corner, voltage, and temperature values are input to the processor. From the description of the circuit design and the description of the one module, the processor determines a first set of circuit resources used by the circuit design and not used by the one module. The processor then determines an estimated level of power consumption as a function of the measured level power consumption, the first set of resources, and the values of the process-corner, voltage, and temperature. Data indicative of the estimated level of power consumption are then output.

In another approach, a method of estimating power consumption of a circuit based on a circuit design is provided. The method includes inputting to a programmed processor, data that indicate measured power consumption and circuit resources used by the one or more modules. For one or more other parts of the design, the method inputs values of parameters that specify an operating speed and a resource count. Process-corner, voltage, and temperature values are also input. The method then determines an estimated level of power consumption as a function of the measured power consumption, the values of the parameters, and the values of the process-corner, voltage, and temperature. Data indicative of the estimated level of power consumption are output.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Some existing tools estimate the level of power consumption based on the input of a specification of the entire design. For example, the tool estimates a level of power consumption based on a specified set of circuit resources of the entire design or a netlist of the entire design. There has been no mechanism by which a predetermined level(s) of power consumption for a module(s) of the design could be substituted for the level of power consumption estimated for that module as part of the entire design.

In one or more embodiments a power estimation tool ("power estimator") is configured to merge measured or predetermined levels of power consumption of one or more modules of a circuit design with an estimated level of power consumption for other parts of the design and determine an overall estimated level of power consumption for the entire design. The power estimator inputs both the description of an entire circuit design and a measured level of power consumption for one or more modules of the circuit design. Based on the description of an entire circuit design and the description of the one or more modules, the power estimator determines the set circuit resources of the circuit design that are not used by the one or more modules. The level of power consumption is then estimated using the determined set of circuit resources and the measured level of power consumption of the one or more modules.

Since a measured level of power consumption is more accurate than an estimated level of power consumption, using the measured level for one or more modules increases the accuracy of the estimated level of power consumption of the overall design. An accurate measurement of power consumption of one or more modules also supports a more accurate calculation of the junction temperature and thereby a more accurate calculation of the static power consumption of the circuit design. A more accurate calculation of the static power consumption of the circuit design contributes to a more accurate total power estimate of the entire circuit design. By taking advantage of known levels of power consumption for parts of a design and reducing algorithmically determined levels of power consumption, a more accurate estimate may be obtained.

Figure 1:
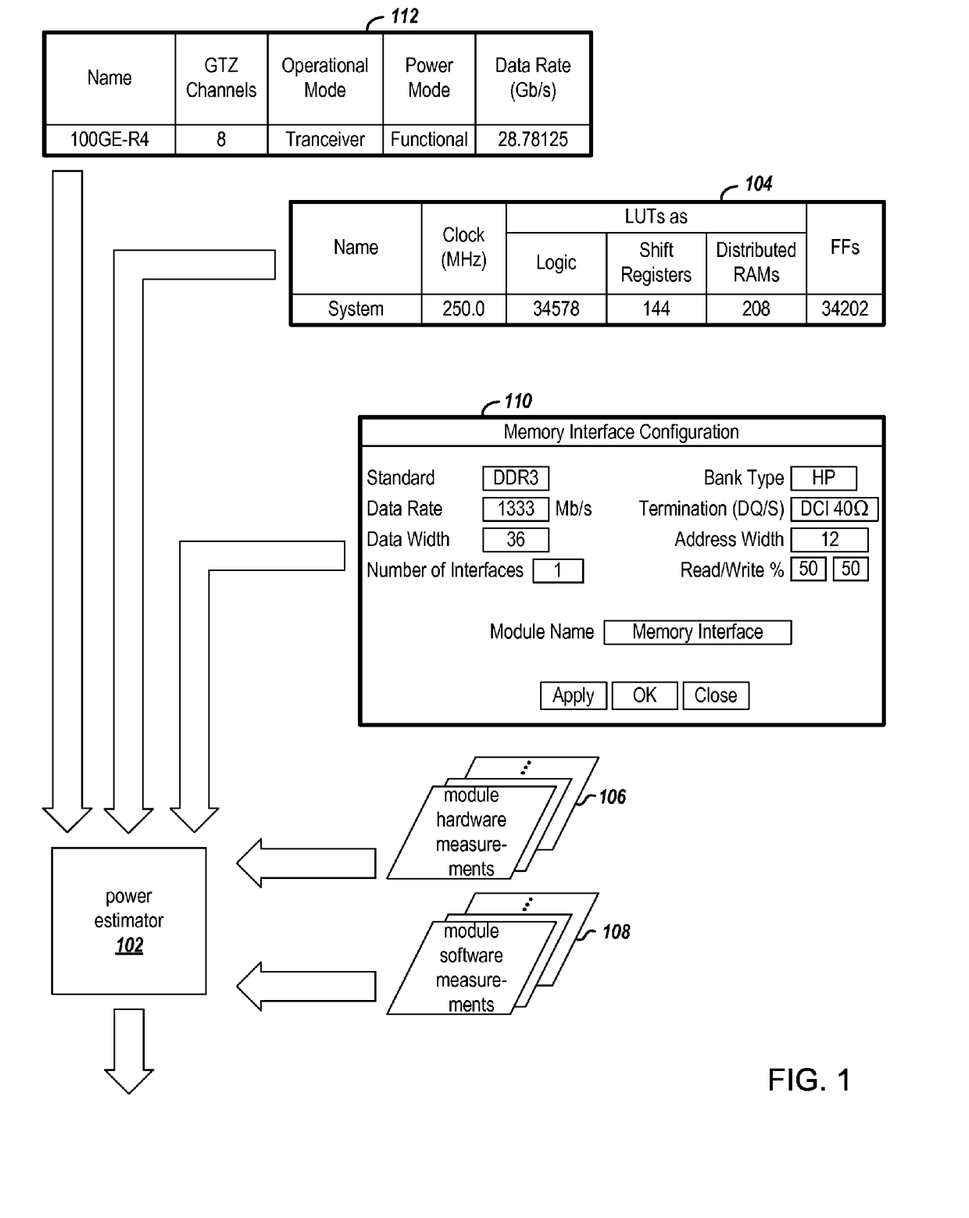
FIG. 1 is a block diagram that shows different inputs to a power estimation tool.

FIG. 1 is a block diagram that shows different inputs to a power estimation tool. The inputs to the power estimator 102 of FIG. 1 generally specify circuit resources used by parts of the design. These inputs are compatible with a resource-based power estimation tool. A resource-based power estimation tool estimates a level of power consumption based on the number and characteristics of the specified circuit resources. In contrast, a netlist-based power estimation tool estimates a level of power consumption by analyzing the netlist of a circuit design.

XPE, which is available from XILINX, Inc., is an example of a logic resource-based power estimation tool. The user enters the number of clocks, LUTs, FFs, DSPs, BRAM, Clock Managers, I/Os, GTs, and some other architecture-specific blocks. For each of these the user enters the frequency, average toggle rate, usage configuration, fanout, and enable rates. The resource-based estimation uses statistically based models to estimate what the actual placement and routing would most likely be. From the logic resource counts and statistical models of placement and interconnect, an expected total power estimate is constructed using the average toggle and enable rates provided by the user.

A netlist-based estimation tool can operate after synthesis, after placement or after routing. In each case the number of logic resources, usage configuration, nets and fanout are all obtained directly from the netlist. In each case the frequencies, toggle and enable rates are obtained from simulation data provided by the user and/or using an algorithm to estimate the values; every net has a unique signal rate. In the post-route case, the capacitance for the actual interconnect usage is known from annotations on the fully implemented netlist. The total power estimate is constructed by summing the calculated power for each logic and interconnect resource in the netlist.

Block 104 shows an example specification of the total circuit resources used by the entire design. Blocks 106 and 108 show input of data that indicates levels of power consumption for one or more modules of the design. Block 106 (module hardware measurements) specifies a level(s) of power consumption that was previously determined by physically measuring power consumption of the module(s) as implemented in a circuit. Block 108 (module software measurements) specifies a level(s) of power consumption that was previously generated by simulating the module(s). Depending on the application, the input to the power estimator 102 may include any combination of one or more module hardware measurements and/or module software measurements. In one embodiment, a level of power consumption is input for each voltage source of the module. Thus, there may be one or more levels of power consumption input for a module.

Along with a level of power consumption, the data included in each of module hardware measurements 106 and module software measurements 108 further specify the circuit resources used by the respective module. The power estimator subtracts the circuit resources used by a module from the set of resources specified by the entire system. For example, the resources used by the entire system are shown in input block 104. The power estimator determines the circuit resources used by the circuit design and not used by the module by subtracting the circuit resources used by the module from the resources specified in block 104. Since a power value is input for the module, that value is used in determining the overall level of power consumption, and the circuit resources used by the module are not used. Along with the predetermined level of power consumption of a module, the associated circuit resources that are specified may include numbers of logic resources, shift registers, distributed RAMs, and flip-flops.

In addition to input of data describing the total of system resources, further inputs to the power estimator include information describing software-generated modules and information describing input/output (I/O) interfaces. For example, data for a software-generated module is shown in block 110 for a memory interface configuration, and data for an I/O interface is shown in block 112 for a SERDES interface. For both the software-generated module and the I/O SERDES interface, the power estimator calculates and displays individual levels of power consumption and adds those values to the power estimate made for the system resources specified in block 104. The system resources specified in block 104 do not account for the additional resources of the software-generated modules and I/O interfaces.

The power estimator determines an estimated level of power consumption as a function of the measured level(s) power consumption and/or simulated level(s) of power consumption of a module(s), the circuit resources used by the system but not used by the module(s), and values of process-corners, voltage, and temperature. Data describing the estimated level of power consumption is output by the power estimator. The data may be output to a display device, a network, or to an electronic storage device.

Figure 2:
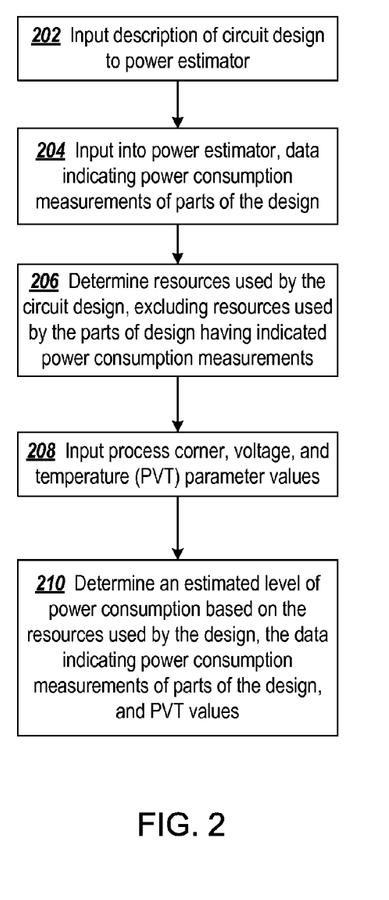
FIG. 2 is a flowchart of an example process for computing an estimated level of power consumption of a circuit design using previously determined levels of power consumption for parts of the design in combination with circuit resources used by the other parts of the design.

FIG. 2 is a flowchart of an example process for computing an estimated level of power consumption of a circuit design using previously determined levels of power consumption for parts of the design in combination with circuit resources used by the other parts of the design.

At block 202, a description of the circuit design is input to a power estimator tool. The description may be either a netlist or a specification of circuit resources required by the circuit design. In an embodiment in which a specification of circuit resources required by the circuit design is input, the description may include values of parameters that specify an operating speed and counts of circuit resources. The operating speed may be a clock rate. The circuit resources may include programmable logic and programmable interconnect resources, for example.

At block 204, respective values of power consumption measurements for one or more modules of the circuit design are input to the power estimator. The values of the power consumption measurements may have been measured from physical circuits that implement the modules or from simulating the modules. Along with the measured values of the one or more modules, counts of resources used by those modules may also be input. The resource counts of the modules are excluded from the calculation of the overall power consumption since the measured values account for the resources. In one embodiment, the full hierarchical module names may be input for the one or more modules. The hierarchical module name may be useful in netlist-based estimators. For example, in the hierarchical name, top/usbEngine/dma_out, dma_out is the known power module and it is located within usbEngine, which is within top. From the netlist the resources in dma_out would be excluded from the power estimate.

At block 206, the process determines the circuit resources that are used by the circuit design, excluding the circuit resources used by the parts of the design for which power measurement values were input at block 204. Process corner, voltage, and temperature (PVT) parameter values are input at block 208. The PVT parameter values may be provided by the designer.

The estimated level of power consumption is determined at block 210. The process uses the count of circuit resources used by the design (excluding the circuit resources of the modules for which power measurement values were input), the power measurement values, and the PVT parameter values to determine the overall level of power consumption. Data indicative of the estimated level of power consumption are output. The data may be output to a display device or a network, or stored on an electronic storage device.

The steps illustrated in FIG. 2 and the other figures herein need not be carried out in the order shown, as long as the data input to or created by the process is available when it is needed. For example, in FIG. 2, steps 202, 204, and 208 can occur in any order, or simultaneously. For example, steps 202 and 204 both must occur prior to step 206, and steps 206 and 208 must occur prior to step 210.

Figure 3:
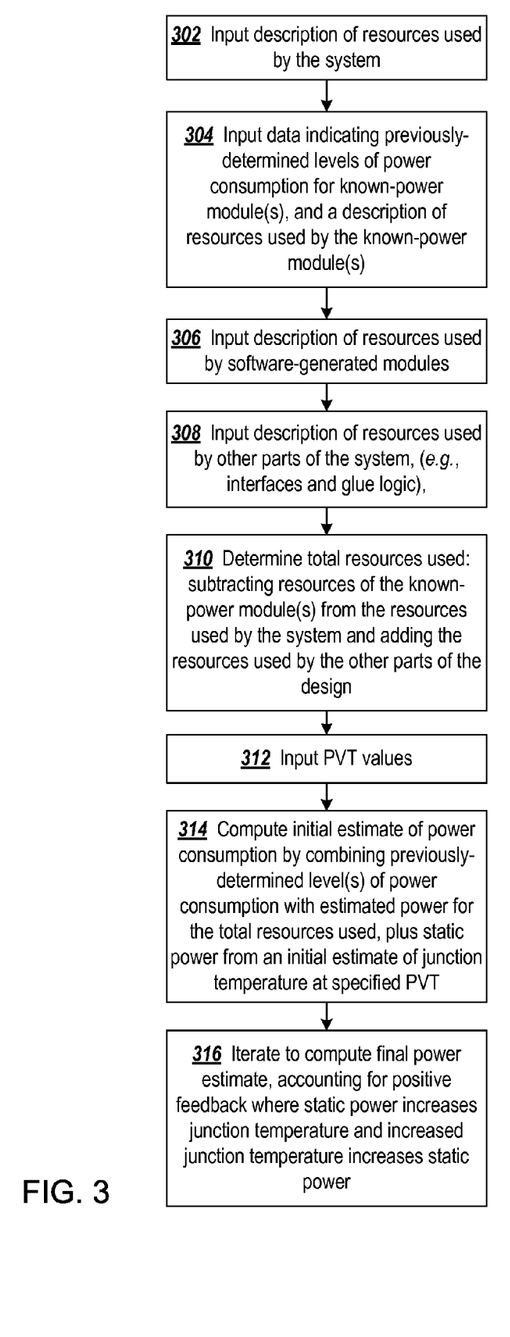
FIG. 3 is a detailed variation on the process of FIG. 2.

FIG. 3 is a detailed variation on the process of FIG. 2. In FIG. 3, the process inputs descriptions of resources used by different parts of the design. The process computes an estimated level of power consumption based on the previously determined levels of power consumption and a total of the resources used (excluding resources of the parts of the design for which levels of power consumption were previously determined).

At block 302, the process inputs a description of circuit resources used by the system circuit design, and at block 304 the process inputs data that describe previously determined levels of power for one or more modules of the circuit design. The modules for which levels of power consumption have been previously determined may be referenced herein as known-power modules. Along with the levels of power consumption of the known-power modules, a description of circuit resources that are used by the known-power modules is input.

At block 306, a description of the circuit resources used by software-generated modules of the circuit design is input. The software-generated modules may be logic cores that are provided from an external source or from a library of logic cores, for example. A description of circuit resources used by other parts of the design is input at block 308. Such other parts may include interfaces and glue logic, for example, which are not accounted for in the description of the resources used by the system circuit design.

The total circuit resources used is determined at block 310. The total circuit resources is the sum of the system circuit design resources (input at block 302), the resources of the software-generated modules (input at block 306), and the resources of the other parts of the system (input at block 308), less the resources used by the known-power modules (input at block 304).

At block 312, the process inputs PVT values, and an initial estimate of power consumption is computed at block 314. The initial estimate is computed by adding the previously determined levels of power consumption of the known-power modules, an estimated level of power consumption for the total circuit resources (from block 310), and a static power estimation based on the PVT parameter values.

The junction temperature (temperature of the die) of an FPGA is dependent on the total power dissipation, ambient temperature and the cooling capabilities of the system. Powering the system will increase the junction temperature, which increases the static power consumption. An increase in static power consumption will increase the junction temperature. Thus, a positive feedback mechanism is created. A stable junction temperature will be reached after a few iterations. Thus, multiple iterations are performed at block 316 to compute a final estimated level of power consumption.

If $T_{ja}$ is the thermal resistance, which quantifies the amount by which the junction temperature rises for each Watt of power dissipated, and $T_j$ is the starting junction temperature in the initial iteration, $$T_j = T_{ambient} + \text{Static\_50 C} * T_{ja} + \text{Dynamic} * T_{ja}$$

Applying example specific values, $$T_j = 50\ C + 0.5\ W * 3\ C/W + 8\ W * 3\ C/W = 75.5$$

$$T_{j+1} = 50\ C + \text{Static\_75.5} * 3\ C/W * 8\ W * 3\ C/W$$

$$T_{j+1} = 50\ C + 0.9\ W * 3\ C/W + 8\ W * 3\ C/W = 76.7$$

$$T_{j+2} = 50\ C + \text{Static\_76.7} * 3\ C/W * 8\ W * 3\ C/W$$

$$T_{j+2} = 50\ C + 0.94\ W * 3\ C/W + 8\ W * 3\ C/W = 76.8$$

$$T_{j+3} = 50\ C + \text{Static\_76.8} * 3\ C/W * 8\ W * 3\ C/W$$

$$T_{j+3} = 50\ C + 0.94\ W * 3\ C/W + 8\ W * 3\ C/W = 76.82$$

$$T_{j+4} = 50\ C + \text{Static\_76.82} * 3\ C/W * 8\ W * 3\ C/W$$

$$T_{j+4} = 50\ C + 0.943\ W * 3\ C/W + 8\ W * 3\ C/W = 76.827$$

$$T_{j+5} = 50\ C + \text{Static\_76.827} * 3\ C/W * 8\ W * 3\ C/W$$

$$T_{j+5} = 50\ C + 0.944\ W * 3\ C/W + 8\ W * 3\ C/W = 76.83$$

The example shows a convergence to the nearest 0.1 degree in two to three iterations and to the nearest 0.01 degree in five to ten iterations. The last iteration will be one of 3 cases: 1) convergence to minimum delta, like less than 0.05 degree change from the previous iteration; 2) a maximum number of iterations (e.g., 10); or 3) a maximum junction temperature for a target device is exceeded. Once a final junction temperature has been computed, the final power estimate may be computed as described in block 314.

Figure 4:
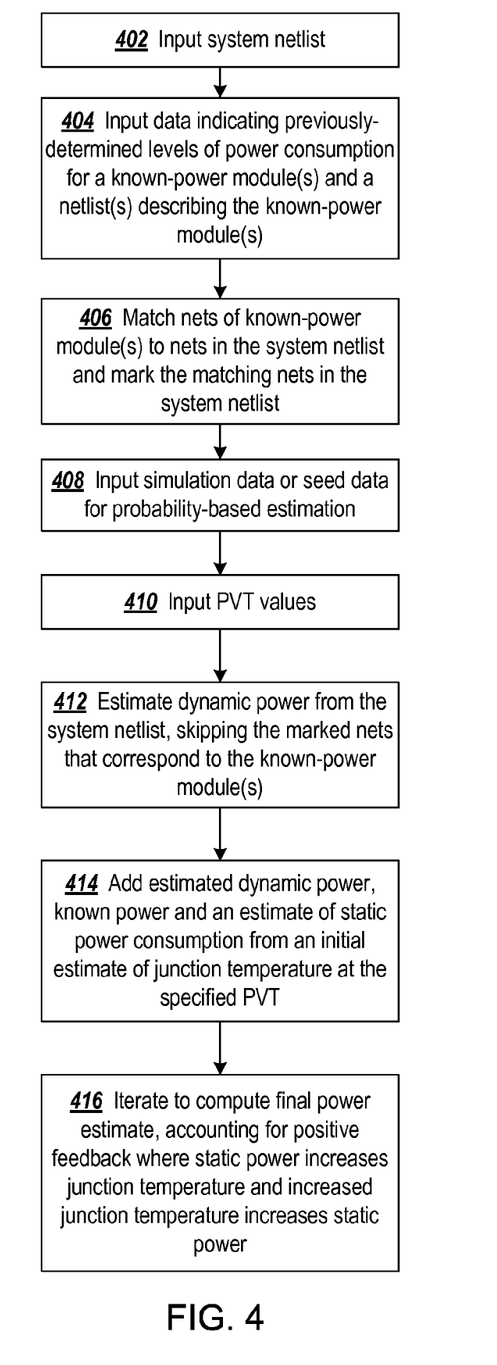
FIG. 4 is another detailed variation on the process of FIG. 2.

FIG. 4 is another detailed variation on the process of FIG. 2. In FIG. 4, the process inputs data indicating a previously determined level(s) of power consumption for a module(s), along with a netlist of the system circuit design and a netlist of the module(s) for which the level(s) of power consumption was previously determined. The process computes an estimated level of power consumption based on the previously determined level(s) of power consumption and the system netlist, less nets that correspond to the module(s) for which the level(s) of power consumption was previously determined.

At block 402, the process inputs a system circuit design netlist, and at block 404, the process inputs data indicating a previously determined level(s) of power consumption for a module(s) of the system circuit design. Along with the measured level(s) of power consumption for the known-power module(s), the process inputs a netlist(s) of the known-power module(s) at block 404.

At block 406, the nets of the known-power module(s) are matched to nets in the system netlist. The matching nets in the system netlist are marked or tagged to indicate that those nets belong to the known-power module(s).

Simulation data or seed data is input at block 408 for use in performing a probability-based estimation of power consumption. PVT values are input at block 410. At block 412, dynamic power consumption is estimated using the system netlist and skipping the nets that are tagged as belonging to the known-power module(s). That is, the nets that belong to the known-power module(s) are not used in estimating the dynamic power consumption. At block 414, an initial level of power consumption is estimated by adding the estimated dynamic level of power consumption (from 412), the known level(s) of power consumption (from 404) and an estimate of static power consumption, which is based on an initial estimate of junction temperature at the specified PVT values. The process iterates at block 416 to compute the final power estimate as described above in regards to block 316 in FIG. 3.

Figure 5:
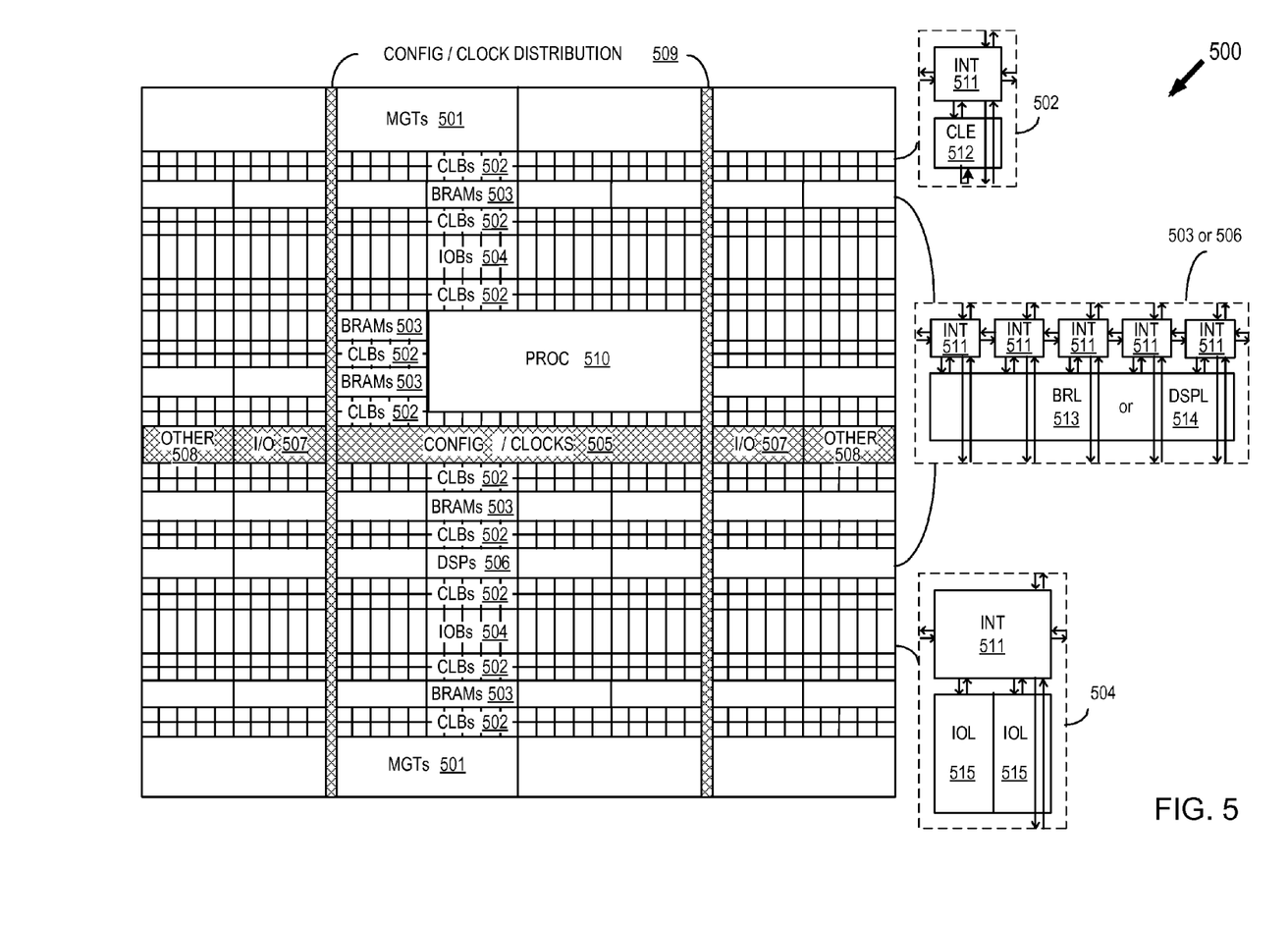
FIG. 5 is a block diagram of an example programmable integrated circuit (IC) for which an estimated level of power consumption may be computed for a circuit design.

FIG. 5 is a block diagram of an example programmable integrated circuit (IC) for which an estimated level of power consumption may be computed for a circuit design. The example programmable IC is an FPGA. FPGAs can include several different types of programmable logic blocks in the array. For example, FIG. 5 illustrates an FPGA architecture (500) that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507), for example, e.g., clock ports, and other programmable logic 508 such as digital clock managers, analog-to-digital converters, system monitoring logic, and so forth. Some FPGAs also include dedicated processor blocks (PROC 510) and internal and external reconfiguration ports (not shown).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element INT 511. A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

Figure 6:
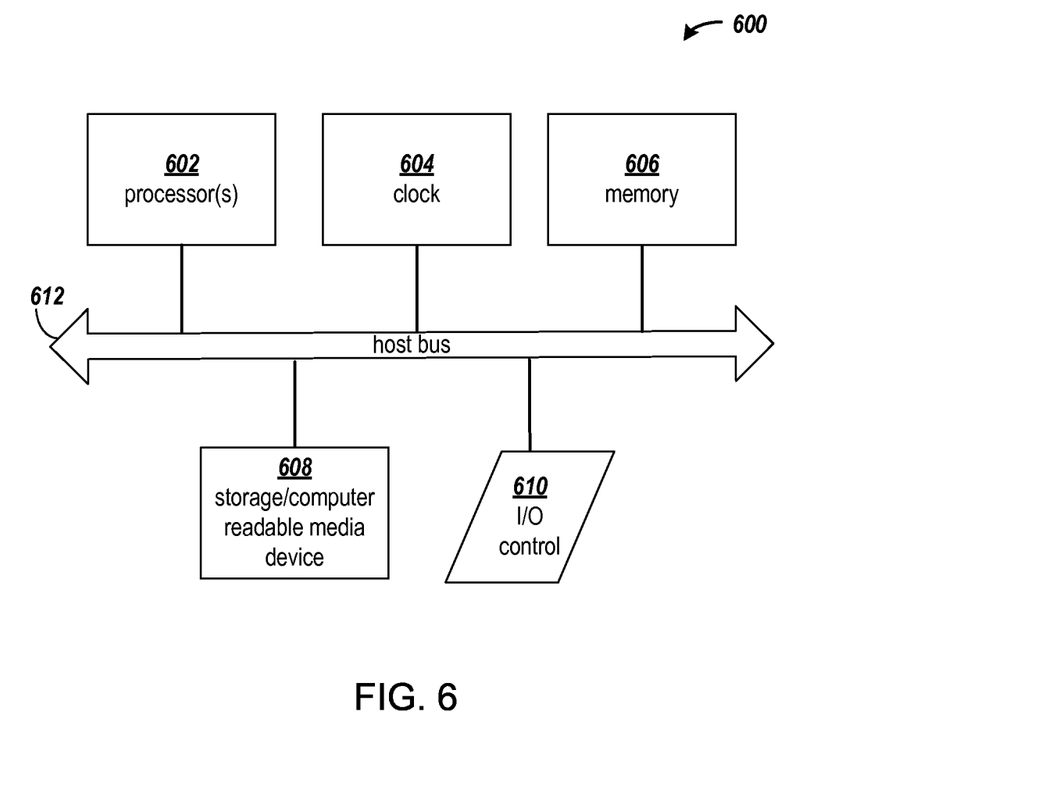
FIG. 6 is a block diagram of an example computing arrangement on which one or more of the processes described herein may be implemented.

FIG. 6 is a block diagram of an example computing arrangement on which one or more of the processes described herein may be implemented. It will be appreciated that various alternative computing arrangements, including one or more processors and a memory arrangement configured with program code, would be suitable for hosting the processes and data structures and implementing the algorithms of the different embodiments. The computer code, comprising the processes of one or more embodiments encoded in a processor executable format, may be stored and provided via a variety of computer-readable storage media or delivery channels such as magnetic or optical disks or tapes, electronic storage devices, or as application services over a network.

Processor computing arrangement 600 includes one or more processors 602, a clock signal generator 604, a memory arrangement 606, a storage arrangement 608, and an input/output control unit 610, all coupled to a host bus 612. The arrangement 600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 602 may be one or more general purpose processors, or a combination of one or more general purpose processors and suitable co-processors, or one or more specialized processors (e.g., RISC, CISC, pipelined, etc.).

The memory arrangement 606 typically includes multiple levels of cache memory and a main memory. The storage arrangement 608 may include local and/or remote persistent storage, such as provided by magnetic disks (not shown), flash, EPROM, or other non-volatile data storage. The storage arrangement may be read or read/write capable. Further, the memory 606 and storage arrangement 608 may be combined in a single arrangement.

The processor arrangement 602 executes the software, which is stored in storage 608 and/or memory 606, reads data from and stores data to the storage 608 and/or memory 606, and communicates with external devices through the input/output control arrangement 610. These functions are synchronized by the clock signal generator 604. The resources of the computing arrangement may be managed by either an operating system (not shown), or a hardware control unit (not shown).

The invention is thought to be applicable to a variety of systems for estimating the level of power consumption for an electronic system. Other aspects and embodiments of the invention will be apparent to those skilled in the art from consideration of the specification. For example, a system may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A system of estimating power consumption of a circuit based on a circuit design, comprising:
    a storage arrangement; and
    a processor coupled to the storage arrangement, wherein the storage arrangement is configured with instructions that when executed by the processor cause the processor to perform operations including:
        inputting a description of the circuit design, wherein the description of the circuit design comprises a netlist;
        inputting, for one module of the circuit design, a measured level of power consumption and a description of the one module, wherein the description of the one module comprises a netlist;
        inputting process-corner, voltage, and temperature values;
        determining from the netlist of the circuit design and the netlist of the one module, a first set of circuit resources used by the circuit design and not used by the one module;
        wherein the determining of the first set of circuit resources includes:
        marking elements of the circuit design netlist that correspond to elements of the one module netlist; and
        determining the first set of circuit resources from the elements of the circuit design netlist that are not marked as corresponding to the elements of the one module netlist;
        determining an estimated level of power consumption as a function of the measured level of power consumption, the first set of circuit resources, and the values of the process-corner, voltage, and temperature; and
        outputting data indicative of the estimated level of power consumption.

2. The system of claim 1, wherein the determining of the estimated level of power consumption includes:
    estimating a first level of power consumption of the first set of circuit resources;
    estimating a level of static power consumption based on the values of the process-corner, voltage, and temperature; and
    summing the first level of power consumption, the measured level of power consumption, and the level of static power.

3. The system of claim 2, the operations further including:
    adjusting the value of the temperature in response to the level of static power consumption; and
    repeating the estimating of the level of static power consumption based on the adjusted value of the temperature and repeating the summing.

4. The system of claim 1, wherein the description of the circuit design includes values of parameters that specify an operating speed and counts of resources.

5. The system of claim 4, wherein the counts of resources include counts of logic resources and interconnect resources.

6. The system of claim 4, wherein the description of the one module includes values of parameters that specify counts of resources.

7. The system of claim 6, wherein the determining of the estimated level of power consumption includes:
    estimating a first level of power consumption of the first set of circuit resources;
    estimating a level of static power based on the values of the process-corner, voltage, and temperature; and
    summing the first level of power consumption, the measured level of power consumption, and the level of static power.

8. The system of claim 7, the operations further including:
    adjusting the value of the temperature in response to the level of static power; and
    repeating the estimating of the level of static power based on the adjusted value of the temperature and repeating the summing.

9. The system of claim 6, wherein the determining of the first set of circuit resources includes:
    determining from the description of the circuit design, a second set of circuit resources used by the circuit design;
    determining from the description of the one module, a third set of circuit resources used by the one module; and
    determining the first set of circuit resources as the second set of circuit resources less the third set of circuit resources.

10. The system of claim 4, wherein the description of the one module includes a hierarchical module name.

11. The system of claim 10, the operations further including:
    adjusting the value of the temperature in response to the level of static power; and
    repeating the estimating of the level of static power based on the adjusted value of the temperature and repeating the summing.

12. The system of claim 1, wherein the determining of the estimated level of power consumption includes:
    estimating a first level of power consumption of the first set of circuit resources;
    estimating a level of static power based on the values of the process-corner voltage, and temperature; and
    summing the first level of power consumption, the measured level of power consumption, and the level of static power.

13. A method of estimating power consumption of a circuit based on a circuit design, comprising:
    performing, on a programmed processor, operations including:
        inputting a description of the circuit design, wherein the description of the circuit design comprises a netlist;
        inputting for one module of the circuit design, a measured level of power consumption and a description of the one module, wherein the description of the one module comprises a netlist;

inputting process-corner, voltage, and temperature values;

determining from the netlist of the circuit design and the netlist of the one module, a first set of circuit resources used by the circuit design and not used by the one module;

wherein the determining of the first set of circuit resources includes:

marking elements of the circuit design netlist that correspond to elements of the one module netlist; and determining the first set of circuit resources from the elements of the circuit design netlist that are not marked as corresponding to the elements of the one module netlist;

determining an estimated level of power consumption as a function of the measured level of power consumption, the first set of circuit resources, and the values of the process-corner, voltage, and temperature; and storing data indicative of the estimated level of power consumption.

14. The method of claim 13, wherein the determining of the estimated level of power consumption includes:

estimating a first level of power consumption of the first set of circuit resources;

estimating a level of static power consumption based on the values of the process-corner, voltage, and temperature; and summing the first level of power consumption, the measured level of power consumption, and the level of static power.

* * * * *